INVENTOR,
DWIGHT N. JOHNSON
BY
Lyon & Lyon
ATTORNEYS

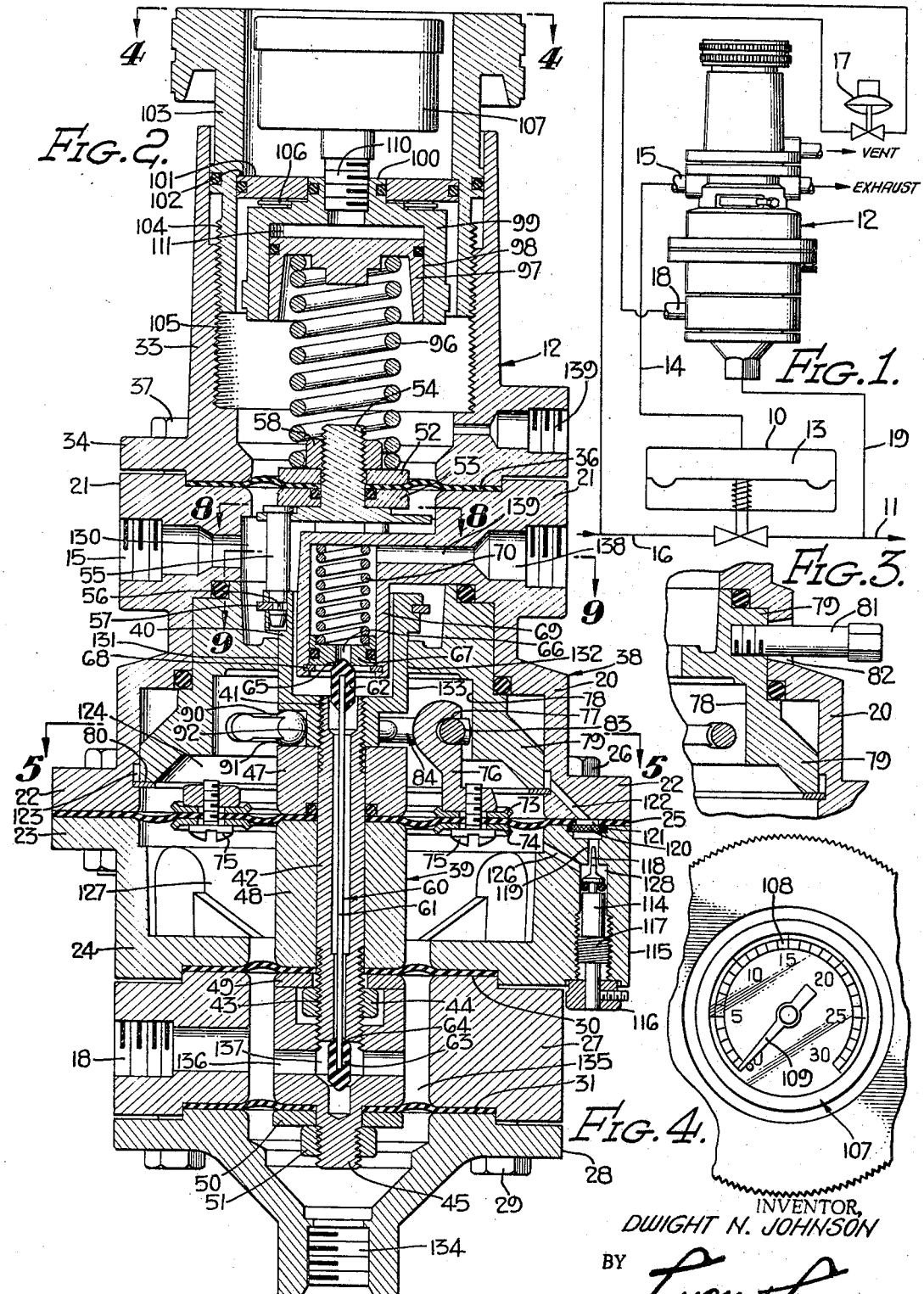

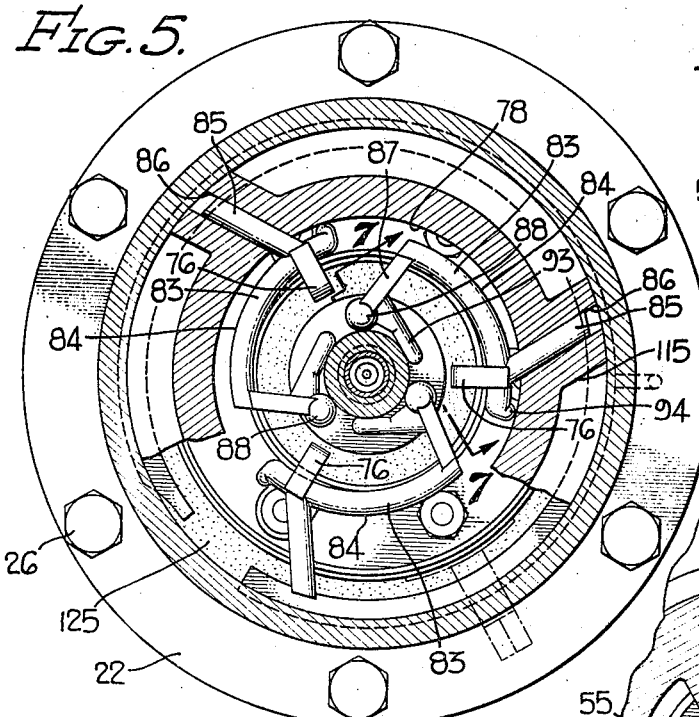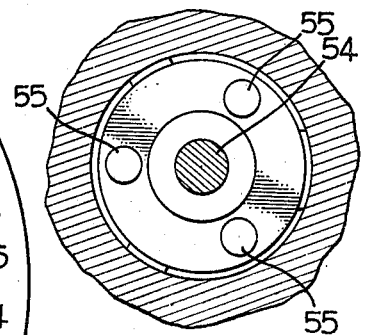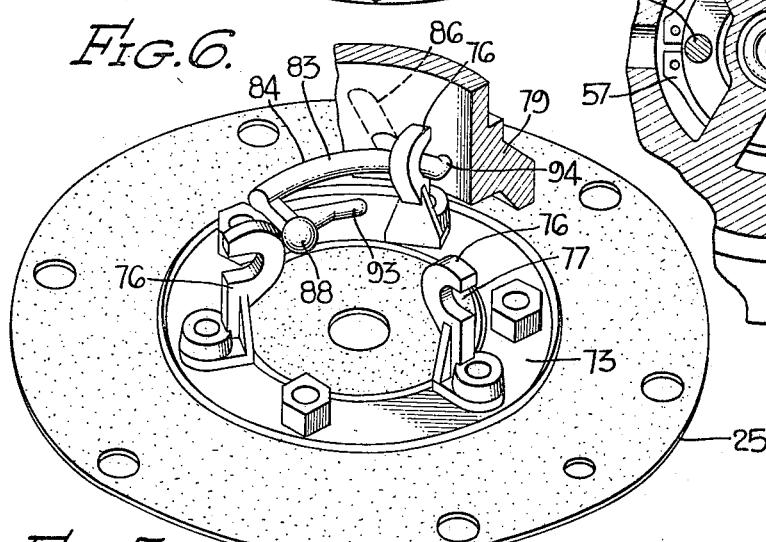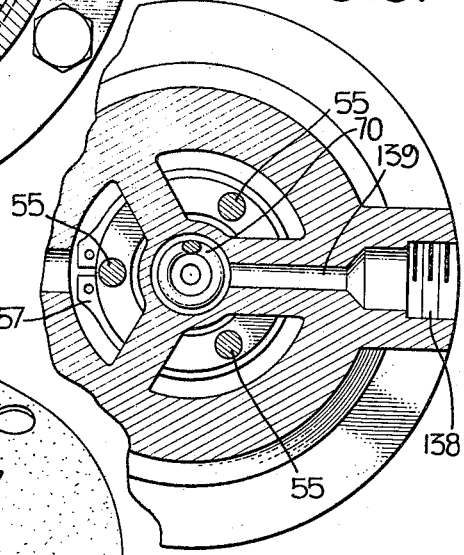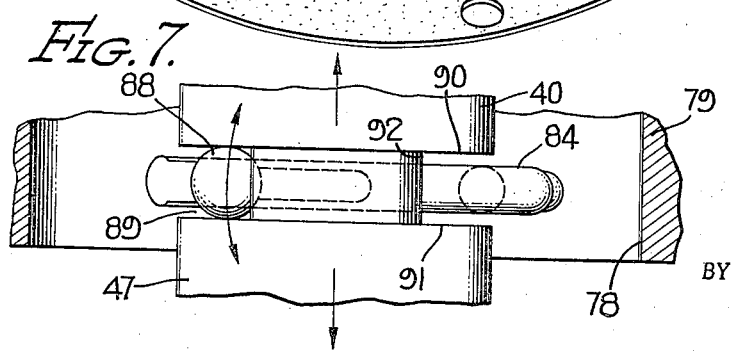

United States Patent Office 3,482,592
Patented Dec. 9, 1969

3,482,592
CONTROLLER FOR DIAPHRAGM MOTOR VALVE
Dwight N. Johnson, Anaheim, Calif., assignor to American Meter Company, Philadelphia, Pa., a corporation of Delaware
Filed Mar. 4, 1968, Ser. No. 710,099
Int. Cl. F16k 31/165, 31/365
U.S. Cl. 137—492.5    14 Claims

ABSTRACT OF THE DISCLOSURE

A controller supplies fluid pressure to a diaphragm motor valve for controlling flow through a pipeline. The controller has four axially spaced flexible diaphragms mounted coaxially in a stationary case, which diaphragms are connected by a central hollow spool, so that their inner portions move in unison. The first, third and fourth diaphragms in the series are preferably of the same configuration and same size, while the second diaphragm is of larger size. A chamber between the first and second diaphragms communicates with an output line leading to the diaphragm motor valve. The chamber between the third and fourth diaphragms communicates with a pressure supply source. The chamber on the other side of the fourth diaphragm communicates with the static line connected to the pipeline downstream from the diaphragm motor valve. The hollow portion of the spool member establishes communication between the supply chamber and the output chamber. A rod extending through the hollow spool passage has a poppet valve at one end for closing the passing through the hollow spool, and has a poppet valve at the other end for closing an exhaust port from the output chamber, so that movement of the spool member toward the output chamber opens the spool passage to connect the supply chamber to the output chamber, and so that movement of the spool member in the other direction connects the output chamber to exhaust. In one form of the device, a reference spring is placed adjacent to the first diaphragm, so that it opposes static line pressure acting on the fourth diaphragm. Variations in static line pressure thus cause axial movement of the spool member. The second diaphragm is connected to the spool member through adjustable linkage to effect output feedback and thus controls the gain between static pressure change and output pressure change to effect optimum operation o fthe diaphragm motor valve.

---

This inventions relates to pneumatic pressure controllers and is particularly directed to apparatus for controlling a diaphragm motor valve by measuring downstream pressure and generating an appropriate signal pressure through proportional and reset action. Prior art controllers have customarily used pneumatic relays which involve bleeding of supply gas continuously during the operation of the controller, even under balance conditions. Such bleeding of gas is often objectionable, both from the standpoint of safety and of consideration of cost of exhausted gas. Moreover, the small nozzles employed are susceptible to plugging and may require considerable maintenance by highly skilled personnel, and furthermore, the devices may require periodic calibration in the field. Among the objects of this invention, therefore, are to provide a pneumatic controller for a diaphragm motor valve, which controller does not bleed supply gas continuously at balance, which does not employ small nozzles susceptible of plugging, which does not require highly skilled personnel for maintenance or periodic field calibration, which is inherently rugged in design and unlikely to be damaged by field handling, and which is less costly to produce than conventional controllers.

Figure 10:
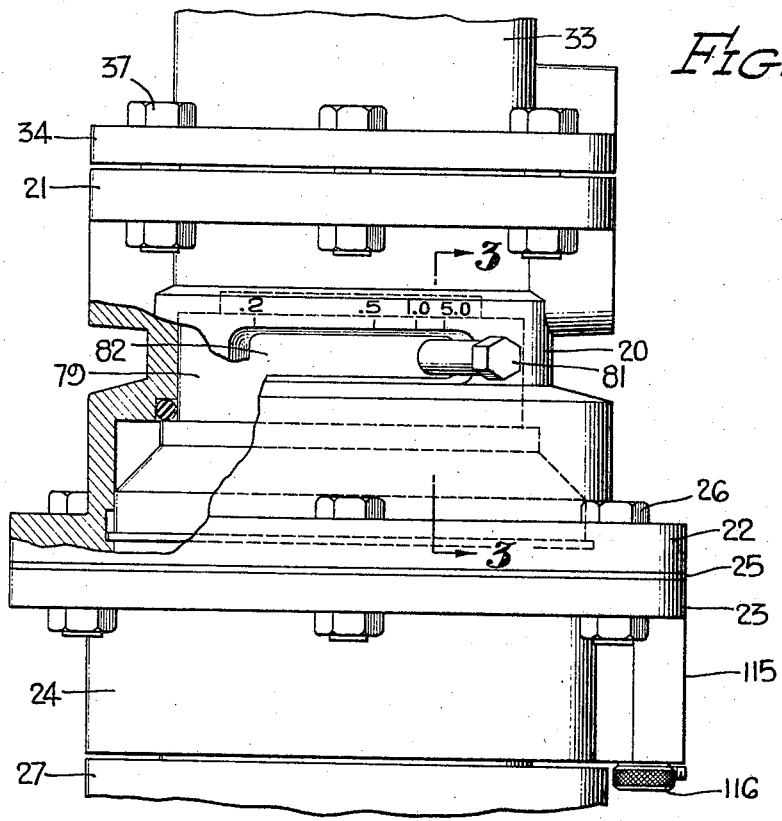
Figure 11:
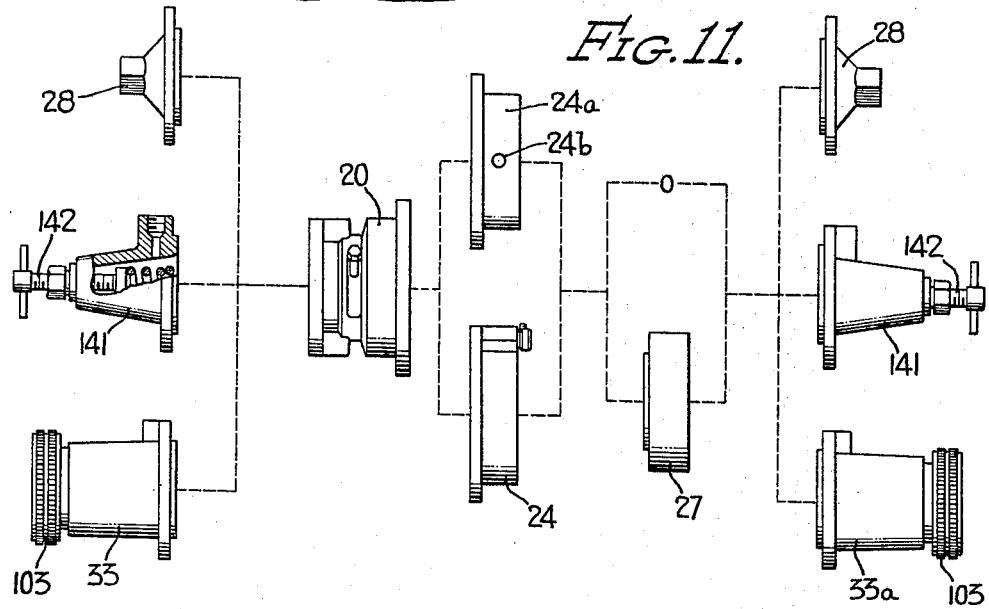

In the drawings:
FIGURE 1 is a diagram showing how the controller is used with a normally open diaphragm motor valve to control flow through a pipeline.
FIGURE 2 is a secontional side elevation showing a preferred form of the controller.
FIGURE 3 is a sectional detail taken substantially on the lines 3—3 as shown on FIGURE 10.
FIGURE 4 is a top plan view, partly broken away, taken along lines 4—4 as shown on FIGURE 2.
FIGURE 5 is a sectional plan view, partly broken away, taken substantially on the line 5—5 as shown on FIGURE 2.
FIGURE 6 is a perspective view of certain of the parts shown in FIGURE 5.
FIGURE 7 is an enlarged side elevation in diagrammatic form showing the cooperative engagement between one of the links and the groove on the spool member.
FIGURE 8 is a sectional plan view, partly broken away, taken on lines 8—8 as shown on FIGURE 2.
FIGURE 9 is a sectional plan view, partly broken away, taken on lines 9—9 as shown on FIGURE 2.
FIGURE 10 is a side elevation, partly broken away.
FIGURE 11 is a diagram showing combinations of parts which may be assembled to form controllers for various different operating conditions.

Referring to the drawings, the direct-acting normally-open diaphragm motor valve 10 controls the flow of fluid through a pipeline 11. The controller generally designated 12 acts to control the pressure in the expansible chamber 13 of the diaphragm motor valve 10 and is connected to this chamber by means of the control line 14 leading from the outlet 15. Supply pressure is delivered through supply line 16 connected to the pipeline 11 upstream from the motor valve 10 and passes through the supply regulator 17 and into the supply inlet 18. The static line 19 is connected to the pipeline downstream from the diaphragm motor valve 10 and to the lower end of the controller 12.

The servopilot body 20 is provided with axially spaced flanges 21 and 22, and the flange 22 mates with a companion flange 23 provided on the body member 24. The outer periphery of a flexible diaphragm 25 is clamped between the flanges by means of threaded fastenings 26. A body spacer 27 and an end cap 28 are held in place by threaded fastenings 29 and serve to clamp the outer peripheries of axially spaced diaphragms 30 and 31 between them. An upper housing 33 is provided with a flange 34 which mates with the flange 21 on the servopilot body 20, and the outer periphery of a flexible diaphragm 36 is clamped between these flanges by means of threaded fastenings 37. The housing 33, servopilot body 20, body member 24, spacer 27, and end cap 28 are thus fixed together and serve as the outer stationary shell generally designated 38.

A spool member generally designated 39 extends axially within the shell and comprises a series of elements clamped end-to-end. Thus, the race collar 40 is connected by threads 41 at its lower end to the upper end of the diaphragm stem tube 42, and the lower end of the tube 42 is connected by threads 43 to the clamping nut 44 and to the stem member 45. Spool spacer elements 47 and 48 and the washer 49 are clamped between the race collar 40 and the clamping nut 44 and serve to clamp the inner peripheral portions of the flexible diaphragms 25 and 30 therebetween. Similarly, the stem member 45 and washer 50 clamp the inner peripheral portion of the flexible diaphragm 31 between them, under force of the clamping nut 51. The inner peripheral portion of the upper flexible diaphrgam 36 is clamped between the washer 52 and the washer 53 mounted on the upper stem 54 by the nut 58. Three circumferentially spaced axially extending pins 55 connect the upper stem 54 to the race collar 40. The washer 53 overlies the head of each pin 55, and the lower end of each pin is provided with a groove 56 engaged by a split retainer ring 57. The race collar 40 and upper stem member 54 are thus connected for axial movement as a unit.

A poppet valve assembly generally designated 60 comprises an axial rod 61 having a poppet valve 62 fixed at its upper end and having a poppet valve 63 fixed at its lower end. The rod 61 extends loosely through the central opening in the tube 42. The poppet valve 63 closes upward against the valve seat 64 in the lower end of the tube 42, and the poppet valve 62 closes upward against the valve seat 65 formed in the central opening 66 of the piston 67. In normal operation, the piston 67 remains seated against the split retainer ring 68 at the bottom of the spring housing 69, under the force of the compression spring 70. The spring housing 69 is positioned centrally and formed as a part of the servopilot body 20. From this description it will be understood that upward movement of the spool member 39 serves to unseat the poppet valve 63 from the seat 64, and downward movement of the spool member 39 serves to unseat the poppet valve 62 from its seat 65.

Duplicate metal rings 73 and 74 are mounted concentrically above and below the diaphragm 25 and are fixed thereto by means of threaded fastenings 75. Hook members 76 are fixed to the metal rings by certain of the fastenings 75, and each hook member is provided with a recess 77 which opens radially outwardly. The hook members 76 project upward into a cavity within the bore 78 in the linkage collar 79. This linkage collar 79 is mounted to turn within the servopilot body 20. A split retainer ring 80 holds the linkage collar against axial movement.

As best shown in FIGURES 3 and 10, a lever 81 fixed to the linkage collar 79 projects through a window slot 82 in the wall of the servopilot body 20, so that the lever may be manually actuated exteriorly of the device to turn the linkage collar 79 with respect to the servopilot body 20. The recess 77 of each hook member 76 slidably engages on the arcuate beam portion 83 of a link 84 pivotally mounted on the linkage collar 79. As best shown in FIGURES 5 and 6, there are three links 84, one for each hook member 76, and each is provided with a pivot shaft 85 extending into a cylindrical opening 86 provided in the linkage collar 79. The arcuate beam portion 83 is curved to conform to the shape of the cavity within the bore 78, and this curved portion 83 terminates in an inwardly directed arm 87. The inner end of the arm is provided with an integral enlarged ball 88 which rides in a raceway or groove 89 defined by the downward-facing wall 90 on the race collar 40, the upward-facing wall 91 on the spool spacer element 47, and the cylindrical wall 92 on the race collar 40. A finger 93 projecting laterally from the arm 87 is positioned to contact the cylindrical wall 92 to limit motion of the link 84 in an inward direction. Motion of the link in an outward direction along the pivot shaft 85 is limited by a contact button 94 which engages the bore 78 of the linkage collar 79. From this description it will be understood that axial movement of the stem member 45 in either direction causes corresponding pivotal movement of each of the links 84 about their respective pivot shaft 85.

Turning of the linkage collar 79 carries the links 84 with it and serves to change the location of the engagement of each of the hook members 76 along the arcuate beam portion 83 of each of the links 84. The linkage collar 79 may be turned from the position shown in FIGURE 5 to a position in which the hook members 76 lie adjacent the link arms 87, or to any intermediate position. When the parts are in the position shown in FIGURE 5, the diaphragm rings 73 and 74 are prevented from moving axially, and when the linkage collar 79 and links 84 are turned to position the arm 87 adjacent the hook member 76, the diaphragm rings 73 and 74 are constrained to move as a unit with the spool member 39. At intermediate positions of the links 84, the diaphragm rings 73 and 74 have axial motion with the spool member 39, but to a lesser degree.

A compression spring 96 is mounted axially within the upper housing 33 and its lower end rests on the washer 52. The upper end of the spring engages a wall of a piston 97 slidably mounted within the cylindrical bore 98 of the cylinder member 99. This member 99 has a central projection 100 at its upper end extending into an opening in a thrust plate 101. This thrust plate engages an annular shoulder 102 provided in the adjusting barrel 103. This barrel is provided with external threads 104 which engage the internal threads 105 in the upper housing 33. A thrust bearing assembly 106 is positioned between the cylindrical member 99 and the thrust plate 101. A pressure gage 107 having a stationary scale 108 and a movable pointer 109 is connected by threads 110 to the space 111 between the piston 97 and the cylinder member 99. This space 111 is filled with hydraulic fluid which actuates the pressure gage. From this description it will be understood that manual rotation of the barrel 103 serves to adjust the force of the spring 96, and that the magnitude of this force is registered by the pointer 109 of the pressure gage 107. It will be noted that the pressure gage 107 does not turn with the adjusting barrel 103, but on the contrary, remains stationary when the barrel 103 is rotated.

An adjustable needle valve assembly 114 is mounted within a boss 115 formed as a part of the member 24. Turning of the valve by means of the knob 116 causes axial movement along the threads 117 and thereby varies the restriction between the valve head 118 and the passage 119 into which it projects. The passage 119 communicates through a filter 120 with an aperture 121 in the diaphragm 25 and with an inclined passage 122 formed in the servopilot body 20. This passage 122 communicates with a groove 123 provided in the wall of the servopilot body 20 and this groove in turn communicates with the chamber 124 above the diaphragm 25, through the space 125 between the ends of the spirit retainer ring 80. A passage 126 in the wall of the member 24 communicates with the chamber 127 below the diaphragm 25, and with the valve cavity 128. The passages 126, 119 and 122 thus provide a bypass across the diaphragm 25 connecting the chambers 124 and 127, and this bypass is restricted by means of the adjustable needle valve 114.

The output port 15 on the servopilot body 20 communicates with the space 130 above the linkage collar 79. This space 130 communicates with the chamber 124 above the diaphragm 25 through the clearance space 131 between the bore 132 of the linkage collar 79 and the outer surface 133 of the race collar 40. The supply port 18 in the body spacer 27 communicates with the chamber 135 between the diaphragms 30 and 31. Lateral ports 136 in the stem member 45 establish communication between the chamber 135 and the central valve cavity 137. When the poppet valve 63 moves downward away from its seat 64, the supply port 18 communicates with the output port 15 through the interior of the diaphragm tube 42 and space 130. When the poppet valve 62 moves away from its seat 65, communication is established between the output port 15 and the exhaust port 138 via the opening 66, interior of the spring housing 69, and passage 139. The interior of the upper housing 33 is vented to atmosphere through vent port 139, or may be connected to a pressure line, as described below.

Assuming the device to be connected in the manner of the diaphragm of FIGURE 1, and assuming the diaphragm motor valve to be operating under stable flowing conditions, the downstream static pressure reacting on diaphragm 31 is opposed by the force of the reference spring 96. The hollow spool member 39 is axially positioned so that both poppet valves 62 and 63 are in contact with their respective seats 65 and 64. This position of the hollow spool member 39 corresponds to stable flow conditions through the diaphragm motor valve, in which pressure in the expansible chamber 13 is neither being increased nor decreased. The constant pressure in the expansible chamber 13 corresponding to stable flow conditions exists in chamber 130 and 124 within the servopilot body 20, and is also communicated through the restricted passage controlled by the needle valve 114 into the chamber 127 below the large diaphragm 25. Supply pressure exists in chamber 135 between the diaphragms 30 and 31.

Assuming a reduction in flow requirements through the pipeline 11, the resulting increase in static pressure below the diaphragm 31 biases the spool 39 to move upward against the reference force of the spring 96, and this upward movement opens the poppet valve 63. Supply pressure in the chamber 135 passes through the diaphragm stem tube and into the output chamber 130. This increasing pressure in the output chamber 130 is reflected through control line 14 to the expansible chamber 13, and is also reflected in chamber 124 to act downward against the large diaphragm 25. The downward force of diaphragm 25 is transmitted through the hook members 76 and links 84 to the hollow spool member 39, thereby repositioning it axially to close the poppet valve 63. The magnitude of output pressure increase at which the spool member is moved to close poppet valve 63 is determined by the mechanical leverage corresponding to the relative position of each hook member 76 with respect to its mating arcuate portion 83 of the link 84. Thus, when the hook members 76 are positioned adjacent the arms 87 of the links 84, the maximum amount of the downward force of the large diaphragm 25 is mechanically applied to the spool member 39 to move it downward, and thereby close the poppet valve 63. The closer that the hook members 76 approach the extreme position shown in FIGURE 5, the less is the amount of downward force applied by the diaphragm 25 to the spool member 39.

The magnitude of output pressure in chamber 124 that causes diaphragm 25 to reseat poppet valve 63 by means of hook members 76 and links 84, with a given increase in static pressure, represents the gain characteristic of the particular setting of the linkage collar 79 by means of the lever 81. For example, a 10 p.s.i. increase in static pressure corresponding to a 2 p.s.i. increase in output pressure would represent a gain characteristic of 0.2 for the device.

Because of the restriction in the bypass controlled by the needle valve 114, the pressure in chamber 127 below the large diaphragm 25 initially remains at the previous lower output pressure. The pressure in the chamber 127, however, gradually increases, with a resultant decrease in downward force applied by diaphragm 25 to the spool member 39 through hook members 76 and links 84. As this downward bias on the spool member 39 decreases, the new higher static pressure below the diaphragm 31 causes an incremental increase in output pressure which is reflected in the expansible chamber 13 of the diaphragm motor valve 10. This increase in output pressure also occurs in chamber 124 above the large diaphragm 25, and this in turn causes a downward bias on the spool member 39, but to a lesser degree. This process results in a gradual closing movement of the diaphragm motor valve 10, and thus gradually re-establishes the static line pressure at its previous value. This process is known as the reset function. The reset function continues with diminishing magnitude until the downstream static pressure reaches the desired set point pressure established by reference spring 96, within the limits of sensitivity of the device.

Assuming a drop in static pressure resulting from an increase in flow requirements through the pipeline 11, the spool member 39 moves downward under reference force of the spring 96, and this downward movement opens the poppet valve 62, permitting output pressure in the expansible chamber 13 to pass through control line 14, chamber 130, and out through exhaust port 138. The drop in output pressure is reflected in chamber 124 with the result that the still-existing pressure in chamber 127 acts upwardly against the large diaphragm 25. The upward force of diaphragm 25 is transmitted through the hook members 76 and links 84 to the hollow spool member 39, thereby repositioning it axially to close the poppet valve 62. The magnitude of output pressure decrease at which the spool member 39 is moved to close poppet valve 62 is determined by the mechanical leverage corresponding to the relative position of the hook members 76 and links 84. Thus, when the hook members 76 are positioned adjacent the arms 87 of the links 84, the maximum amount of the upward force of the large diaphragm 25 is mechanically applied to the spool member 39 to move it upward, and thereby close the poppet valve 62. The closer that the hook members 76 approach the extreme position shown in FIGURE 5, the less is the amount of upward force applied by the diaphragm 25 to the spool member 39.

Because of the restriction in the bypass passage through the needle valve 114, the pressure in chamber 127 below the large diaphragm 25 initially remains at the previous higher output pressure. The pressure in the chamber 127, however, gradually decreases with a resultant decrease in upward force applied by the diaphragm 25 to the spool member 39 through hook members 76 and links 84. As this upward bias on the spool member 39 decreases, the lower static pressure below the diaphragm 31 causes an incremental decrease in output pressure which is reflected in the expansible chamber 13 of the diaphragm motor valve 10. This decrease in output pressure also occurs in chamber 124 above the large diaphragm 25, and this in turn causes an upward bias on the spool member 39, but to a lesser degree. This process results in a gradual opening movement of the diaphragm motor valve 10 and thus gradually re-establishes the static line pressure at its previous value.

Poppet valve 62 in cooperation with spring-urged seat 66 serves as a limiting means for the output pressure in chamber 130. This construction insures that pressure in the chamber 130 and control line 14 can never exceed the maximum allowable pressure in the expansible chamber 13 of the diaphragm motor valve. If the output pressure in chamber 130 should exceed the safe value for the expansible chamber 13, the pressure below the seat 67 acting on the annular area of the seat 67 will compress the spring 70, permitting an upward movement of the poppet valve assembly, and bringing poppet valve 63 into contact with its seat 64. If closing of the poppet valve 63 against the seat 64 for any reason does not terminate flow of pressure from the supply to the output chamber 130, the seat 67 is further deflected against the force of the spring 70, thereby opening the poppet valve 62 and permitting flow through seat passage 66 and through passage 139 to exhaust port 138.

FIGURE 11 shows how the controller may be assembled in a variety of different configurations to meet different operating requirements. In the preferred form of the device, described in detail above, the servo-pilot body 20 is connected at one end to the upper housing 33 and at the lower end to the body member 24, body spacer 27, and end cap 28. However, other combinations of components may also be used. Thus, instead of the upper housing 33 with its hydraulically-operated pressure gage, the bonnet 141 may be flange-connected to the upper end of the servopilot body 20. (The flexible diaphragms 36, 25, 30 and 31 are omitted from the diagram of FIGURE 11, for clarity of illustration.) The adjusting screw 142 is used in a conventional manner to adjust the force of the spring 96. When the reset feature is not required, the body member 24 is replaced by the body member 24a having the same construction, except that the needle valve 114 and its associated passages are omitted, and instead a vent port 24b is provided in the wall of the member 24a, venting the chamber 127 to atmosphere. The body spacer 27 may be omitted in certain cases, and in such event the lower end cap 28 is fixed to the body member 24 or 24a, thereby combining the static and supply ports at 134, and the parts 31, 45, 50 and 51 are omitted. The supply line 16 and its regulator 17 are no longer needed. The above-mentioned pressure limiting means finds particular use when the static and supply ports are combined, because the desired static pressure may exceed the maximum operating pressure in expansible chamber 13 of the diaphragm motor valve 10.

Each of the foregoing combinations is intended for use with a normally open diaphragm motor valve 10. If the diaphragm motor valve is of the normally closed type, rather than normally open, it is necessary that the output signal pressure in line 14 lower in proportion to an increase in static pressure in line 19. This is accomplished by reversing the location of the static pressure load and the spring reference load relative to the servo-pilot body 20. This may be accomplished by connecting the end cap 28 to the upper end of the servopilot body 20, and by employing the load spring 96 below the body spacer 27, with its upper end engaging the washer 50. The lower end of the spring is then contacted by the adjustable stem 142 of the bonnet 141 or by the piston 97 within the lower housing 33a. The lower housing 33a contains the same parts as the upper housing 33, previously described.

In some installations, it is desirable to have a pressure force in addition to the spring reference force. This is accomplished by applying a controlled pressure to the port 139 in the upper housing 33. In this situation the reading of the dial gage 107 represents the combined reference force of the spring 96 and the externally applied reference pressure. If the bonnet 141 is employed in place of the upper housing 33, the vent port of the bonnet may be used in the same manner. If a pressure reference only is required, without any reference spring force, the end cap 28 may be employed and its single port used to admit the reference pressure.

I claim:

1. A controller for pneumatically operating a diaphragm motor valve in a pipeline, comprising in combination: a stationary case, axially spaced parallel flexible diaphragms mounted in said case, one diaphragm being larger than the other, a central spool member connecting said diaphragms so that their inner portions move in unison, the case and smaller diaphragm defining a chamber for connection to an input line, the case and the larger diaphragm defining a second chamber communicating with a signal line to the diaphragm motor valve, the spool member having a passage communicating with both chambers, a rod extending through the spool passage and having a poppet valve at each end, an exhaust port in the second chamber having a valve seat engageable by one of said poppet valves, the spool member having a valve seat engageable by the other poppet valve, whereby movement of the spool member toward the second chamber opens the spool passage to connect the input line to the signal line, and whereby movement of the spool member in the other direction connects the signal line to said exhaust port.

2. The combination set forth in claim 1 in which adjustable means are provided in said second chamber for connecting an annular portion of the larger diaphragm for movement with the spool member in a variable ratio.

3. A controller for pneumatically operating a diaphragm motor valve in a pipeline, comprising incombination: a stationary case, three axially spaced parallel flexible diaphragms mounted in said case, two adjacent diaphragms being the same size and the other being larger, a central spool member connecting said diaphragms so that their inner portions move in unison, the case and one of the smaller diaphragms defining a chamber for connection to a static line communicating with the pipeline downstream from the diaphragm motor valve, the case and the larger diaphragm defining a second chamber communicating with a signal line to the diaphragm motor valve, the two smaller diaphragms defining between them and within the case a third chamber communicating with a pressure supply line, the spool member having a passage communicating between the second and third chambers, a rod extending through the spool passage and having a poppet valve at each end, an exhaust port in the second chamber having a valve seat engageable by one of said poppet valves, the spool member having a valve seat engageable by the other poppet valve, whereby movement of the spool member toward the second chamber opens the spool passage to connect the supply line to the signal line, and whereby movement of the spool member in the other direction connects the signal line to said exhaust port.

4. The combination set forth in claim 3 in which adjustable means are provided in said second chamber for connecting an annular portion of the larger diaphragm for movement with the spool member in a variable ratio.

5. The combination set forth in claim 3 in which there is provided a restricted bypass between the second and third chambers.

6. The combination set forth in claim 3 in which the valve seat for the exhaust port is movably mounted and spring biased toward closed position.

7. A controller for pneumatically operating a diaphragm motor valve in a pipeline, comprising in combination: a stationary case, four axially spaced parallel flexible diaphragms mounted in said case, three of the diaphragms being the same size and the fourth being larger, a central spool member connecting said diaphragms so that their inner portions move in unison, the case and one of the smaller diaphragms defining a chamber for connection to a static line communicating with the pipeline downstream from the diaphragm motor valve, the case and the larger diaphragm defining a second chamber communicating with a signal line to the diaphragm motor valve, two of the smaller diaphragms defining between them and within the case a third chamber communicating with a pressure supply line, the spool member having a passage communicating between the second and third chambers, a spring positioned adjacent the other small diaphragm to apply an axial force to the spool member in opposition to static pressure in the first chamber, a rod extending through the spool passage and having a poppet valve at each end, an exhaust port in the second chamber having a valve seat engageable by one of said poppet valves, the spool member having a valve seat engageable by the other poppet valve, whereby movement of the spool member in the direction opposite the force of the spring opens the spool passage to connect the supply line to the signal line, and whereby movement of the spool member in the other direction connects the signal line to said exhaust port.

8. The combination set forth in claim 7 in which adjustable means are provided in said second chamber for connecting an annular portion of said large diaphragm for movement with the spool member in a variable ratio.

9. In combination, a flexible annular diaphragm mounted within a stationary case, a spool member mounted for axial movement within the case and fixed to the inner periphery of said diaphragm, a plurality of circumferentially spaced axially extending hook members fixed to said flexible diaphragm, a gain control member mounted to turn within said case, a plurality of links each having an arcuate portion engaged by one of said hook members, respectively, cooperating means on the spool member and each of said links whereby axial movement of said spool member relative to the case causes pivotal movement of each link relative to said gain control member, and means accessible exteriorly of said case for turning said gain control member to change the position of said links relative to said hook members.

10. The combination set forth in claim 9 in which a groove is provided on the spool member and wherein means on each link is received in said groove.

11. The combination set forth in claim 9 in which annular metal rings are fixed concentrically to the large diaphragm on opposite sides thereof and wherein said hook members are fixed to said rings.

12. In a device of the class described, having a stationary case and a spool member mounted for axial movement within the case, and having at least one flexible diaphragm connecting the spool to the case, the combintion comprising: a housing adapted to be fixed to the case, a resilient element mounted within said housing to apply an axial force to the spool member, a sealed structure forming a captive hydraulic system having a movable part engaging the resilient element, a pressure gage assembly connected to said hydraulic system to indicate pressure therein, and means for moving said structure axially.

13. The combination set forth in claim 12 wherein the effective area of the movable part is substantially the same as the effective area of the diaphragm.

14. The combination set forth in claim 12 wherein the sealed structure comprises a piston movable in a cylinder member, the piston having an effective area substantially the same as the effective area of the diaphragm, a thrust plate, a thrust bearing assembly operatively positioned between the thrust plate and the cylinder member, the diaphragm forming one wall of a chamber within the housing, and a port in the housing communicating with said chamber.

References Cited
UNITED STATES PATENTS 2,950,729  8/1960  Hartz _____ 137—492.5 XR
3,246,664  4/1966  Mercier _____ 137—492.5 XR HENRY T. KLINKSIEK, Primary Examiner